United States Patent [19]

Bourcier de Carbon

[11] 4,166,522

[45] Sep. 4, 1979

[54] PNEUMATIC SPRING DEVICE

[76] Inventor: Christian Bourcier de Carbon, 64, Blvd. Maurice-Barres, Neuilly-sur-Seine, France

[21] Appl. No.: 938,719

[22] Filed: Aug. 31, 1978

Related U.S. Application Data

[63] Continuation of Ser. No. 792,570, May 2, 1977, abandoned.

[51] Int. Cl.² ............................................. F16F 9/48
[52] U.S. Cl. .................................... 188/287; 188/317
[58] Field of Search ............... 188/286, 287, 317, 318, 188/322

[56] References Cited

U.S. PATENT DOCUMENTS

| | | | |
|---|---|---|---|
| 1,164,371 | 1/1930 | Lovejoy | 188/286 X |
| 1,744,514 | 12/1931 | Thompson | 188/287 |
| 2,346,275 | 4/1944 | Read et al. | 188/317 X |
| 2,379,750 | 7/1945 | Rossman | 188/317 X |

FOREIGN PATENT DOCUMENTS 2232963  2/1973  Fed. Rep. of Germany ........... 188/287

*Primary Examiner*—Duane A. Reger
*Attorney, Agent, or Firm*—Watson, Cole, Grindle & Watson

[57] ABSTRACT

A gas-operated absorber includes a piston and cylinder unit wherein axially extending grooves of a predetermined length are provided on the inner surface of the cylinder to vary the dampening effect during the expansion stroke of the piston. The piston expansion movement is braked as the piston moves away from the grooves during its expansion stroke, and through holes in the piston head permit passage of gas therethrough during the expansion stroke although, when the piston moves away from the grooves, a flexible lip on the piston completely closes the holes to effect further braking. Additional holes are also provided in the piston head through which the gas may pass throughout the expansion stroke.

6 Claims, 1 Drawing Figure

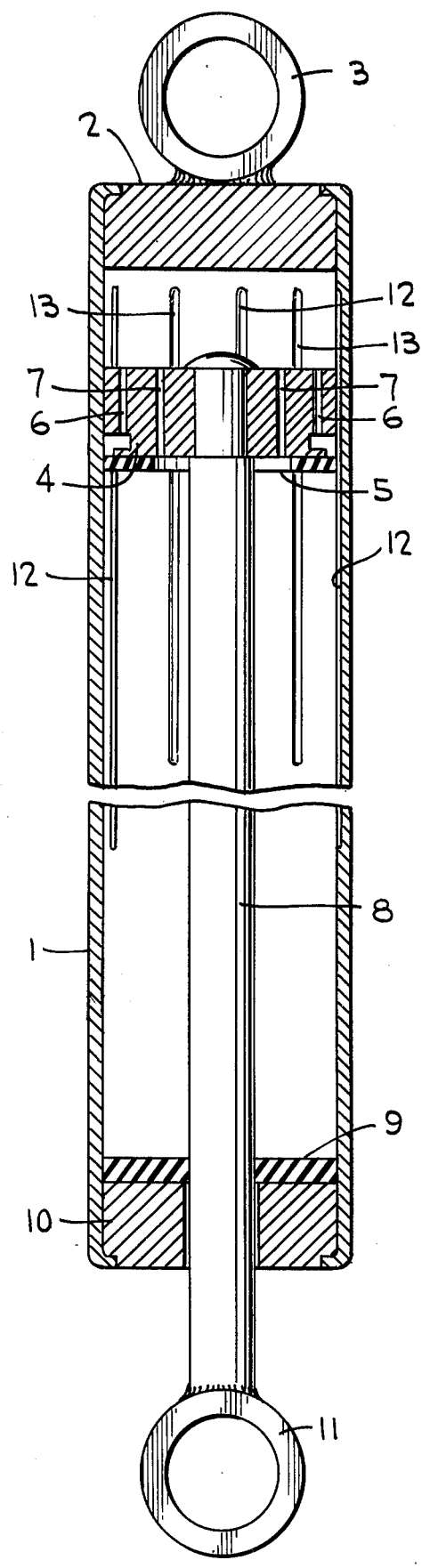

PNEUMATIC SPRING DEVICE

This is a continuation of application Ser. No. 792,570 filed May 2, 1977.

The present invention relates to a gas-operated absorber functioning simultaneously as a spring.

Pneumatic absorbers which function simultaneously as a spring and an absorber are already known in the art. Specifically, a device which accomplishes these two functions is described in French Pat. No. 1,051,475, filed on Dec. 10, 1951 under the title "Pneumatic Absorber", and published on Jan. 15, 1954 in the name of the present inventor.

In one of their applications, collapsible gas springs are used to balance the weight or open and close doors and hoods and folding devices so that their movements are facilitated. These devices function as highly flexible compression springs and allow a large quantity of energy to be stored in a small space. They generally consist of a cylinder formed by a tube closed at one end in which a piston can slide, affixed to a rod which extends from the tube through a sealing joint and a guide. The closed end of the tube and the opposite end of the rod are provided with ferrules so that they can be attached to the fixed and mobile parts of the door, hood or folding device. The tube is filled with gas under high pressure for ejecting the rod from the tube, with the result that the unit functions as a compression spring.

It is often desirable to control the speed of the movements of the doors, hoods or folding devices provided with gas-springs, and to this end, said springs are equipped with valves and openings to restrain the flow of the gas or any other fluid used from one part to another within the device.

The best characteristics achievable for a gas-operated spring such as this are a minimum of braking during compression and effective braking at the end of the expansion stroke so as to prevent too great a speed from developing at the end of the stroke, causing a sudden shock to the device, the spring being stopped by itself when fully expanded.

In some existing devices, this braking effect, reinforced at the end of the stroke during the expansion of the gas-spring, is supplied by the use of a certain quantity of fluid in the device, providing better braking than that of the compressed gas, while passing through the same valves and openings.

The main object of the present invention is to provide end-of-stroke braking when the gas-spring is expanded solely by pneumatic means.

To do so, the piston of the present invention is, on the one hand, provided with a gauged passage which can be embodied by one or several openings or valves to allow the gas to pass more or less freely in the folding movement of the device and, on the other hand, the inside surface of the cylinder includes at least one groove extending over a part of its length to allow a relatively free expansion movement of the device according to the invention during the initial phase of the stroke and to cause a strong braking effect when the piston reaches that area of the cylinder which has no groove.

According to a more specific feature of the invention, the inside surface of the cylinder includes a plurality of grooves of unequal length.

One other more specific feature is that the length of the grooves ranges between approximately ½ and ¾ of the total stroke-length of the piston in the cylinder.

Other features and advantages of the present invention will become evident upon reading the following description with its accompanying drawing, illustrating a longitudinal cross-section of one embodiment of the present invention.

A cylinder 1 is closed at one of its ends by, for example, a cap 2, set or kept in place by any suitable means, such as by welding or screwing. Cap 2 includes an eye 3 so that the cylinder can be attached to one of the parts of a folding device (not shown).

A piston 4, capable of sliding in cylinder 1, is provided in its upper part with a flexible lip 5 which can, depending on which direction piston 4 is moving, allow or prevent the passage of gas through one or several openings 6 located in piston 4 opposite circular lip 5. Piston 4 also includes one or several openings 7 located a predetermined distance from the axis of cylinder 1 and which allow the gauged passage of the gas between the chambers (unreferenced) delimited by piston 4. Piston 4 is affixed to a rod 8 which extends from cylinder 1 through a sealing joint 9 and a guide 10, attached to cylinder 1. Piston 4 also includes an undercut portion (unnumbered) at the lower end thereof in communication with openings 6. Sealing joint 9 insures static tightness against the inside wall of cylinder 1, and dynamic and static tightness against the surface of rod 8. The outer end of rod 8 includes an eye 11 for attachment to another part of the folding device. A small amount of grease can be applied in the assembly near sealing joint 9 to insure its lubrication. The inside of cylinder 1 is highly pressurized by a gas under pressure, such as nitrogen through ports (not shown) communicating with the chambers on opposite sides of piston 4.

In addition, the inside surface of cylinder 1 includes grooves such as 12 and 13, extending axially over part of the length of the cylinder, preferably from the end opposite that through which rod 8 extends from the cylinder. In the embodiment shown, the grooves are made by cutting channels in the material, although any suitable means can be used for making such channels, especially by using rollers. In the embodiment shown, grooves 12 and 13 differ in length; the usefulness of this difference in length will become apparent below when the operation of the device according to the invention is described.

The device operates in the following way: the high gas-pressure inside cylinder 1 is exerted differentially on the two surfaces of piston 4 so that said piston pushes rod 8 outside of the cylinder through the sealing joint 9 and guide 10. The force exerted is analogous to that which would be exerted by a compression spring placed over piston 4. The device will thereby function as a compression spring.

During one extension movement of rod 8 from its fully retracted position, flexible lip 5 of piston 4 cooperates with the inside wall of cylinder 1 to insure tightness between the periphery of piston 4 and the inside wall of cylinder 1, thus establishing between the lip and the cylinder a friction which brakes the expansion; in addition, the gas confined between piston 4 and sealing joint 9 is slightly more compressed than the gas confined between piston 4 and the extremity 2 of cylinder 1. This gas can travel beyond the piston through gauged openings 6 and 7 as well as through grooves 12 and 13 which, because of their lengths, will brake to some extent the expansion movement of the device at the desired speed.

When rod 8 is extended from the device by a predetermined length, piston 4 reaches the extremity of grooves 13. The total section for passage of the gas from the area included between piston 4 and sealing joint 9 towards the area included between piston 4 and cap 2 is thus reduced, and braking power is increased. The rod may, however, continue to extend itself because of the passage of the gas through openings 7 and along grooves 12. When piston 4 reaches a level corresponding to the extremity of grooves 12, the section for passage of the gas decreases still further and the movement of the rod likewise decreases. The remainder of the expansion stroke of the device thus occurs with a section for passage of the gas which is reduced to the total section of openings 7, thereby appreciably damping the movement.

In a preferred embodiment, the length of the grooves is between ½ and ¾ of the stroke of the piston. It can be seen, however, that the number of grooves 12 and 13 as well as their respective lengths will depend on the speed of expansion desired in the beginning and on when this expansion speed is to be decreased. Similarly, the number and size of gauged openings 7 will determine the exit speed of the rod at the moment of total expansion. It is also noteworthy that if an opening operation in several phases is desired, e.g., slow-fast-slow, grooves can be provided which begin only at a certain distance from cap 2. Likewise, the grooves can be completely eliminated over a certain length to achieve a localized deceleration.

The present invention can be embodied by means which are different from those described here; in particular, the shape of openings 7 or of grooves 12 and 13 can be modified without departing from the framework of the invention.

Given that end-of-stroke braking during expansion of the device is achieved pneumatically, the device operates at will for any angle or position of assembly whatsoever, which is not the case in presently known devices wherein the second stage of braking is assured by a certain quantity of oil, necessarily found in the lower part of the device.

The present invention is not limited to the examples of embodiment which have just been described; on the contrary, as the man of the art will readily see, it can be varied and modified in a number of ways.

I claim :

1. A pneumatic spring device, comprising, a pneumatically-pressurized cylinder closed at one end and having a guide element at an opposite end thereof, a piston within said cylinder, a rod connected to said piston and extending outwardly of said cylinder through an opening in said guide element, said piston being movable toward said guide element during an extension of said rod outwardly of said cylinder and being movable toward said one end during a retraction of said rod inwardly of said cylinder, said piston having a predetermined thickness and delimiting variable first and second chambers within said cylinder respectively located between said piston and said one end and between said piston and said opposite end, an inner surface of said cylinder having at least one axial groove therein with one terminal end spaced from said one end of said cylinder a distance less than said thickness, an opposite terminal end of said groove being spaced from said guide element a distance greater than said thickness, said piston having at least a pair of co-axial openings therein, said piston having an outer undercut portion at a surface thereof facing said guide element, one of said openings extending into said undercut portion, a circular lip of flexible material attached to said piston surface and being in tight frictional engagement with said inner surface of said cylinder, and said lip overlying said undercut portion, whereby movement of said piston during the extension of said rod is braked by the frictional engagement between said lip and said inner surface, and whereby movement of said piston during the extension of said rod is dampened a first amount from between said ends of said groove as determined by the pneumatic flow through said groove and both said openings from said second to said first chamber, and is dampened a second amount greater than said first amount between said opposite terminal end and said guide element as determined by the pneumatic flow through only the other of said openings from said second to said first chamber.

2. The device according to claim 1, wherein said inner surface has a plurality of axial grooves therein with one terminal end thereof spaced from said one end of said cylinder a distance less than said thickness, opposite terminal ends of said grooves being spaced from said guide element different distances greater than said thickness.

3. The device according to claim 1, wherein said groove extends over a length of said cylinder corresponding to one-half to three-fourths the total stroke-length of said piston.

4. The device according to claim 2, wherein said grooves extend over a length of said cylinder corresponding to one-half to three-fourths the total stroke-length of said piston.

5. The device according to claim 1, wherein said groove is continuous.

6. The device according to claim 2, wherein said grooves are each continuous.

* * * * *